United States Patent
Ouyang et al.

(10) Patent No.: US 10,509,144 B2
(45) Date of Patent: Dec. 17, 2019

(54) TWO-DIMENSIONAL SQUARE-LATTICE PHOTONIC CRYSTAL BASED ON CROSS RODS AND ROTATED HOLLOW SQUARE RODS

(71) Applicant: Zhengbiao Ouyang, Shenzhen, Guangdong (CN)

(72) Inventors: Zhengbiao Ouyang, Guangdong (CN); Zhiliang Chen, Guangdong (CN)

(73) Assignee: SHENZHEN UNIVERSITY, Shenzhen (CN)

(*) Notice: Subject to any disclaimer, the term of this patent is extended or adjusted under 35 U.S.C. 154(b) by 192 days.

(21) Appl. No.: 15/822,240

(22) Filed: Nov. 27, 2017

(65) Prior Publication Data

US 2018/0074228 A1 Mar. 15, 2018

Related U.S. Application Data

(63) Continuation of application No. PCT/CN2016/083060, filed on May 23, 2016.

(30) Foreign Application Priority Data

May 27, 2015 (CN) .......................... 2015 1 0280521

(51) Int. Cl.
*G02B 1/00* (2006.01)
*B82Y 20/00* (2011.01)

(52) U.S. Cl.
CPC .............. *G02B 1/005* (2013.01); *B82Y 20/00* (2013.01)

(58) Field of Classification Search
None
See application file for complete search history.

(56) References Cited

U.S. PATENT DOCUMENTS

| | | | | |
|---|---|---|---|---|
| 9,880,444 | B2* | 1/2018 | Ouyang | G02B 26/00 |
| 9,885,939 | B2* | 2/2018 | Ouyang | G02B 26/00 |
| 9,904,010 | B2* | 2/2018 | Ouyang | G02B 26/02 |
| 9,971,227 | B2* | 5/2018 | Ouyang | G02B 6/122 |
| 10,094,979 | B2* | 10/2018 | Ouyang | G02B 6/122 |
| 2007/0172188 | A1* | 7/2007 | Noda | B82Y 20/00 |
| | | | | 385/130 |
| 2016/0370501 | A1* | 12/2016 | Ouyang | G02B 1/005 |
| 2017/0242156 | A1* | 8/2017 | Ouyang | G02B 6/1225 |

(Continued)

FOREIGN PATENT DOCUMENTS

CN 104297842 A * 1/2015 ............. G02B 1/005

*Primary Examiner* — Rhonda S Peace
(74) *Attorney, Agent, or Firm* — Wen IP LLC; Zhihua Han

(57) ABSTRACT

The present invention discloses a 2D square-lattice PhC based on cross rods and rotated hollow square rods, comprising a high-refractive-index dielectric rod, a cross plate dielectric rod and a low-refractive-index background dielectric rod; the unit cell of the square-lattice PhC includes a high-refractive-index rotated hollow square rod, a cross plate dielectric rod and a background dielectric; the hollow square rod has an outer contour which is a first rotated square rod with the rotated angle α of 45° to 65° and the side length b of 0.6 a to 0.75 a, and a hollow part with a cross section being a second rotated square rod with the rotated angle β of 25° to 50° and the side length c of 0.33 a to 0.5 a; the first rotated square rod is connected with the cross plate dielectric rod, plate dielectric rods of which in the horizontal and vertical directions have different widths.

13 Claims, 11 Drawing Sheets

(56) References Cited

U.S. PATENT DOCUMENTS

2017/0285440 A1\* 10/2017 Ouyang ................. G02B 6/122
2017/0351157 A1\* 12/2017 Ouyang .................... G02F 3/00
2018/0074228 A1\* 3/2018 Ouyang ................. G02B 1/005
2018/0088276 A1\* 3/2018 Ouyang ............... G02B 6/1223

\* cited by examiner

TWO-DIMENSIONAL SQUARE-LATTICE PHOTONIC CRYSTAL BASED ON CROSS RODS AND ROTATED HOLLOW SQUARE RODS

CROSS-REFERENCE TO RELATED APPLICATIONS

This application is a Continuation Application of PCT Application No. PCT/CN2016/083060, filed on May 23, 2016, which claims priority to Chinese Patent Application No. 201510280521.1 filed on May 27, 2015, the entire contents of which are hereby incorporated by reference.

FIELD OF THE INVENTION

The present invention relates to a broadband absolute photonic bandgap (PBG) photonic crystal (PhC), and more specifically, relates to a two-dimensional (2D) square-lattice PhC based on cross rods and rotated hollow square rods.

BACKGROUND OF THE INVENTION

In 1987, the concept of a PhC was respectively proposed by E. Yablonovitch in American Bell Labs when studying how to suppress spontaneous radiation and S. John in Princeton University when studying photon localization. The PhC has a material structure of a dielectric material arranged periodically in space, and is often an artificial crystal formed by two or more than two materials having different dielectric constants.

Control on light is one of the main challenges in modern optics. With increasing development of optical communication and computer technology, it becomes more important to control and operate light signals. Since the PhC has the property of allowing light at a specific frequency and a specific direction to pass or forbidding in the PhC, the researches on the PhC have received people's attention.

Because the electromagnetic field mode in an absolute PBG is completely nonexistent, when an electron energy band is superposed with the absolute PBGs, the spontaneous radiation is suppressed. The PhC with the absolute PBGs can change the interaction between a field and a material by controlling the spontaneous radiation and improve the performance of an optical device. The PhC can be applied to semiconductor lasers, solar cells, high-quality resonant cavities and filters.

The distribution of a dielectric material in unit cells of the PhC has a strong impact on the PBGs, the selection of a PBGs has a great impact on the application of the PhC, and particularly, a large absolute PBGs is very effective on the control of broadband signals.

For the light having the frequency in an absolute PBG, it cannot pass any matter for different polarizations and wave vectors. The large PBGs can be used for manufacturing optical waveguides, liquid crystal PhC fibers, negative refractive index imagers, PhC lasers of a defect mode in defect cavities. Large absolute PBGs can suppress spontaneous radiation in PhC lasers of a defect mode, particularly under the condition that the spectral range of spontaneous radiation is very wide. If we desire to obtain PhC resonant cavities with narrow resonant peaks, large absolute PBGs are necessary. In various optical devices, polarization-independent absolute PBGs are very important. Just because many devices of PhCs utilize PBGs, worldwide scientists are striving to design PhC structures with larger absolute PBGs.

SUMMARY OF THE INVENTION

The present invention aims to overcome the defects of the prior art and provide a 2D square-lattice PhC structure facilitating optical integration and having a large absolute PBG relative value.

The technical solution adopted by the invention to solve the technical problem is as follows:

A 2D square-lattice PhC based on cross rods and rotated hollow square rods in the present invention includes a high-refractive-index dielectric rod, a cross plate dielectric rod and a low-refractive-index background dielectric rod; the PhC structure is formed by unit cells arranged according to square-lattices; the lattice constant of the square-lattice PhC is a; the unit cell of the square-lattice PhC includes a high-refractive-index rotated hollow square rod, a cross plate dielectric rod and a background dielectric; the outer contour of the hollow square rod is a first rotated square rod with the rotated angle $\alpha$ of 45° to 65° and a side length b of 0.6 a to 0.75 a; the cross section of the hollow part of the hollow square rod is a second rotated square rod with the rotated angle $\beta$ of 25° to 50° and the side length c of 0.33 a to 0.5 a; the first rotated square rod is connected with the cross plate dielectric rod; the cross plate dielectric rod is located in the middle of the square edge of the square-lattice; plate dielectric rods of the cross plate dielectric rod in the horizontal and vertical directions have different widths; the width d of the plate dielectric rod in the horizontal direction is 0.01 a to 0.03 a; and the width e of the plate dielectric rod in the vertical direction is 0.01 a to 0.03 a.

The high-refractive-index dielectric is the one with the refractive index of greater than 2.

The high-refractive-index dielectric is silicon, gallium arsenide or titanium dioxide.

The high-refractive-index dielectric is silicon, with the refractive index of 3.4.

The background dielectric is the low-refractive-index dielectric.

The low-refractive-index background dielectric is a dielectric with the refractive index of less than 1.6.

The low-refractive-index background dielectric is air, vacuum, magnesium fluoride or silicon dioxide.

The low-refractive-index background dielectric is air.

The high-refractive-index dielectric is silicon, and the low-refractive-index dielectric is air; the rotated angle $\alpha$ of the first rotated square rod is greater than 45° and less than 65°, and its side length b is greater than 0.6 a and less than 0.75 a; the rotated angle $\beta$ of the second rotated square rod is greater than 25° and less than 50°, and its side length c is greater than 0.33 a and less than 0.5 a; the width d of the plate dielectric rod in the horizontal direction is greater than 0.01 a and less than 0.03 a; the width e of the plate dielectric rod in the vertical direction is greater than 0.01 a and less than 0.03 a; and the absolute PBG relative value of the PhC structure is greater than 10%; and the high-refractive-index dielectric is silicon, and the low-refractive-index dielectric is air; the rotated angle $\alpha$ of the first rotated square rod is 60.04°, and its side length b is 0.6927 a; the rotated angle $\beta$ of the second rotated square rod is 27.348°, and its side length c is 0.45344 a; the width d of the plate dielectric rod in the horizontal direction is 0.0216 a; the width e of the plate dielectric rod in the vertical direction is 0.0256 a; and the absolute PBG relative value of the PhC structure is 19.51%.

The high-refractive-index dielectric is silicon, and the low-refractive-index dielectric is air; the rotated angle $\alpha$ of the first rotated square rod is greater than 45° and less than 65°, and its side length b is greater than 0.6 a and less than 0.75 a; the rotated angle β of the second rotated square rod is greater than 25° and less than 50°, and its side length c is greater than 0.33 a and less than 0.5 a; the width d of the plate dielectric rod in the horizontal direction is greater than 0.01 a and less than 0.03 a; the width e of the plate dielectric rod in the vertical direction is greater than 0.01 a and less than 0.03 a; and the absolute PBG relative value of the PhC structure is greater than 10%; and the high-refractive-index dielectric is silicon, and the low-refractive-index dielectric is air; the rotated angle α of the first rotated square rod is 60.04°, and its side length b is 0.6927 a; the rotated angle β of the second rotated square rod is 27.348°, and its side length c is 0.45344 a; the width d of the plate dielectric rod in the horizontal direction is 0.0216 a; the width e of the plate dielectric rod in the vertical direction is 0.0256 a; and the absolute PBG relative value of the PhC structure is 19.51%.

The high-refractive-index dielectric is silicon, and the low-refractive-index dielectric is air; the rotated angle α of the first rotated square rod is greater than 45° and less than 65°, and its side length b is greater than 0.6 a and less than 0.75 a; the rotated angle β of the second rotated square rod is greater than 25° and less than 50°, and its side length c is greater than 0.33 a and less than 0.5 a; the width d of the plate dielectric rod in the horizontal direction is greater than 0.01 a and less than 0.03 a; the width e of the plate dielectric rod in the vertical direction is greater than 0.01 a and less than 0.03 a; and the absolute PBG relative value of the PhC structure is greater than 10%; and the low-refractive-index dielectric is air; the rotated angle α of the first rotated square rod is 60.04°, and its side length b is 0.6927 a; the rotated angle β of the second rotated square rod is 27.348°, and its side length c is 0.45344 a; the width d of the plate dielectric rod in the horizontal direction is 0.0216 a; the width e of the plate dielectric rod in the vertical direction is 0.0256 a; and the absolute PBG relative value of the PhC structure is 19.51%.

The 2D square-lattice PhC based on cross connecting rods and rotated hollow square pillar in the present invention can be widely applied to design of large-scale integrated optical circuits. Compared with the prior art, the present invention has the following advantages:

(1) The PhC structure of the present invention has a very large absolute PBG, and can thus bring greater convenience and flexibility to design and manufacture of PhC devices.

(2) In a PhC integrated optical circuits, different optical devices in the optical circuit and different optical circuits are respectively easily connected and coupled, and the square-lattice structure can simplify the optical circuits and easily improve the integration degree of the optical circuits.

(3) The design is compact, the manufacture is easy, and the manufacturing cost is reduced.

These and other objects and advantages of the present invention will become readily apparent to those skilled in the art upon reading the following detailed description and claims and by referring to the accompanying drawings.

The present invention is more specifically described in the following paragraphs by reference to the drawings attached only by way of example.

DETAILED DESCRIPTION OF THE EMBODIMENTS

The terms a or an, as used herein, are defined as one or more than one, The term plurality, as used herein, is defined as two or more than two. The term another, as used herein, is defined as at least a second or more.

The present invention will be further elaborated below in combination with the accompanying drawings and specific embodiments.

Figure 1:
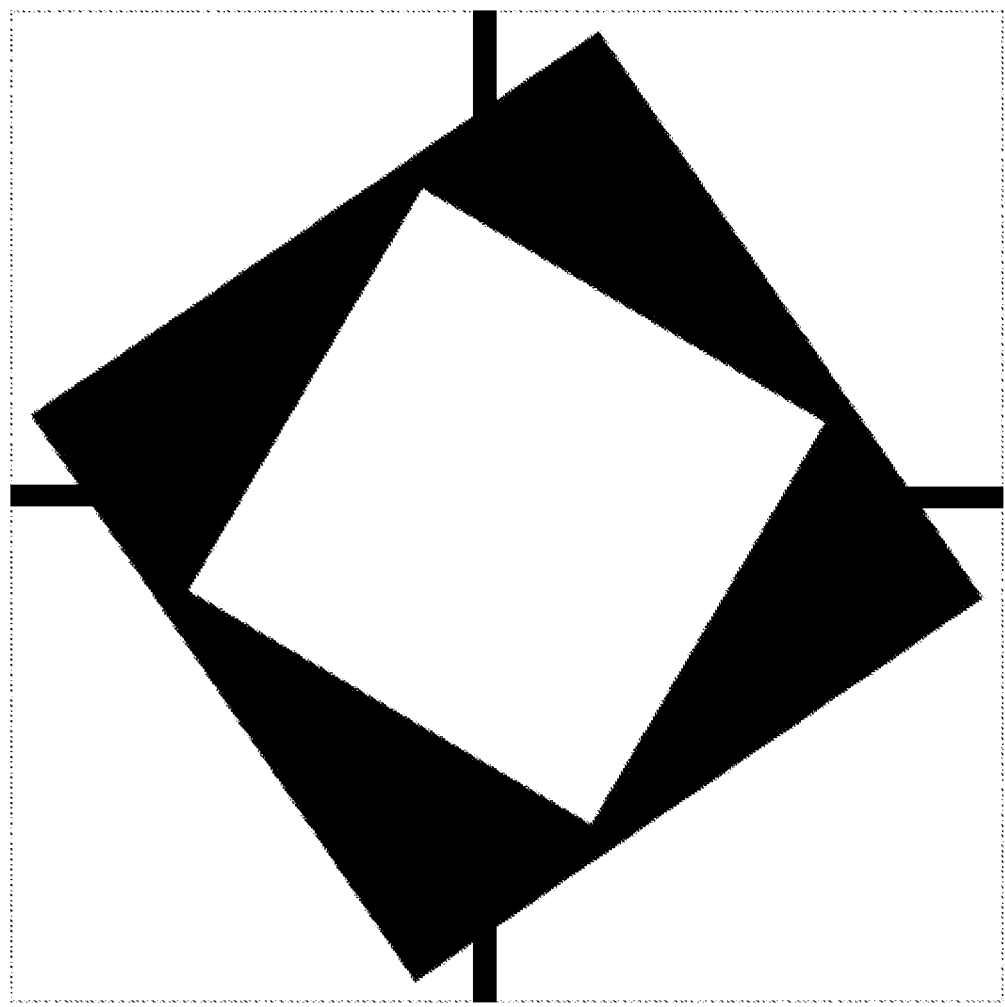
FIG. 1 is a structural schematic diagram of a unit cell of a 2D square-lattice PhC based on cross rods and rotated hollow square rods.
Figure 2:
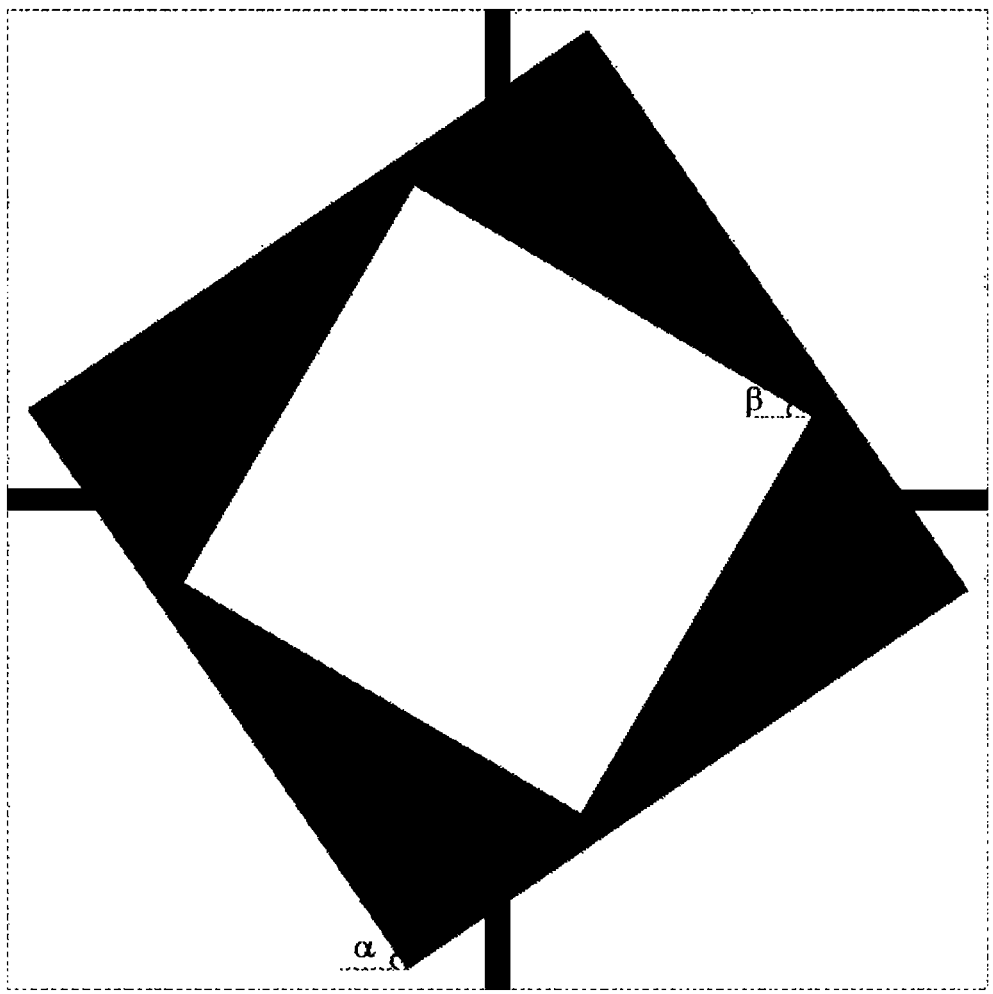
FIG. 2 is a section view of a parameter structure adopting an auxiliary line as shown in FIG. 1.

Referring to FIG. 1, a 2D square-lattice PhC based on cross rods and rotated hollow square rods in the present invention includes a high-refractive-index dielectric rod, a cross plate dielectric rod and a low-refractive-index background dielectric rod; the PhC structure is formed by unit cells arranged according to square-lattices; the unit cell of the square-lattice PhC includes a high-refractive-index rotated hollow square rods, a cross plate dielectric rod and a background dielectric, the background dielectric is a low-refractive-index dielectric, and the lattice constant of the square-lattice PhC is a; as seen in FIG. 2, the outer contour of the hollow square rod in the present invention is the first rotated square rod with the rotated angle α of 45° to 65° and the side length b of 0.6 a to 0.75 a; the cross section of the hollow part of the hollow square rod is the second rotated square rod with the rotated angle β of 25° to 50° and the side length c of 0.33 a to 0.5 a; the first rotated square rod is connected with the cross plate dielectric rod; the cross plate dielectric rod is located in the middle of the square edge of the square-lattice; plate dielectric rods of the cross plate dielectric rod in the horizontal and vertical directions have different widths; the width d of the plate dielectric rod in the horizontal direction is 0.01 a to 0.03 a; and the width e of the plate dielectric rod in the vertical direction is 0.01 a to 0.03 a. The high-refractive-index dielectric is the one with the refractive index of greater than 2, and the high-refractive-index dielectric is silicon, gallium arsenide or titanium dioxide; the low-refractive-index background dielectric is a dielectric with the refractive index of less than 1.6, and the low-refractive-index background dielectric is air, vacuum, magnesium fluoride or silicon dioxide.

Embodiment 1

Figure 3:
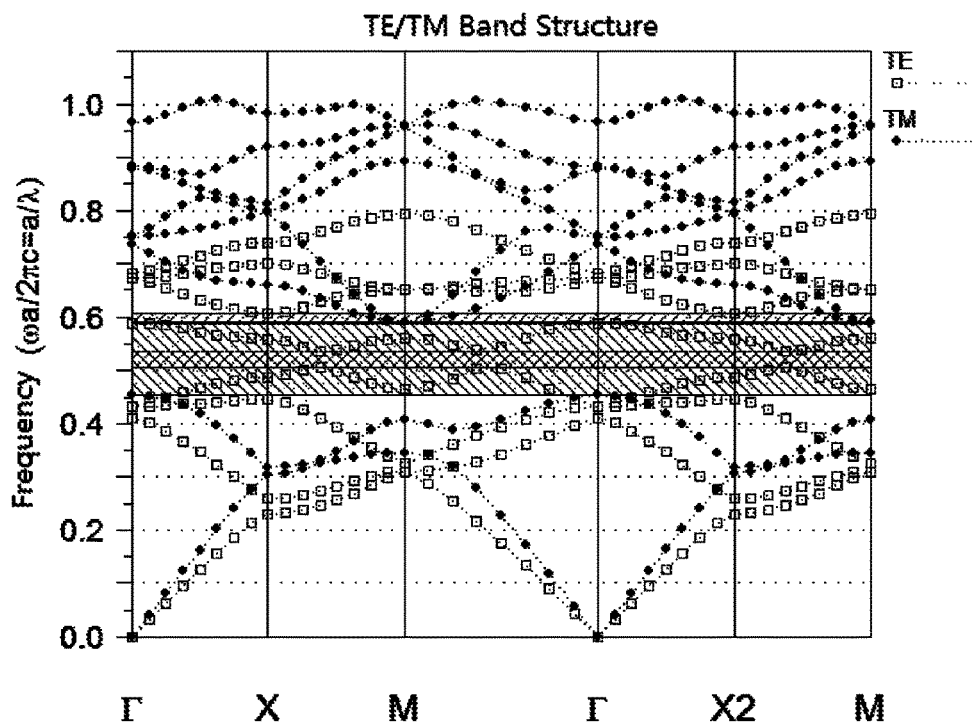
FIG. 3 is a structural diagram of a PBG corresponding to unit cell parameter values adopted in embodiment 1.

The high-refractive-index material is silicon, the low-refractive-index is air, $\alpha=45°$, $\beta=27.348°$, b=0.6927 a, c=0.45344 a, d=0.0216 a, e=0.0256 a. It can be known from the numerical simulation result of this embodiment in FIG. 3 that the large absolute PBG relative value is 6.19%.

Embodiment 2

Figure 4:
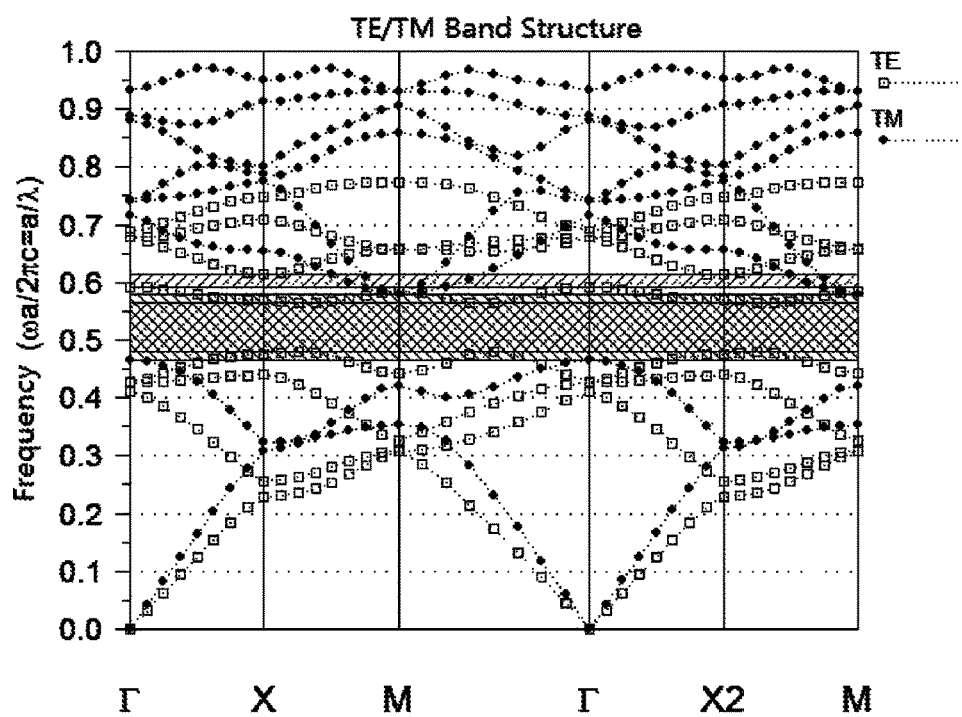
FIG. 4 is a structural diagram of a PBG corresponding to unit cell parameter values adopted in embodiment 2.

The high-refractive-index material is silicon, the low-refractive-index is air, $\alpha=55°$, $\beta=27.348°$, b=0.6927 a, c=0.45344 a, d=0.0216 a, e=0.0256 a. It can be known from the numerical simulation result of this embodiment in FIG. 4 that the large absolute PBG relative value is 16.04%.

Embodiment 3

Figure 5:
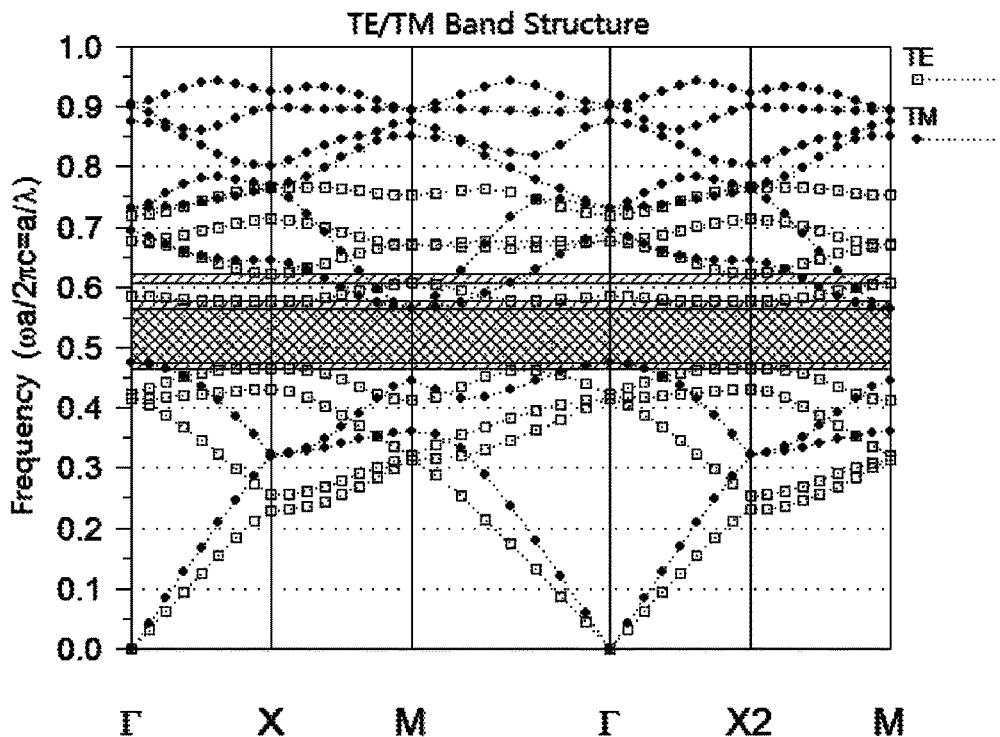
FIG. 5 is a structural diagram of a PBG corresponding to unit cell parameter values adopted in embodiment 3.

The high-refractive-index material is silicon, the low-refractive-index is air, $\alpha=65°$, $\beta=27.348°$, b=0.6927 a, c=0.45344 a, d=0.0216 a, e=0.0256 a. It can be known from the numerical simulation result of this embodiment in FIG. 5 that the large absolute PBG relative value is 17.18%.

Embodiment 4

Figure 6:
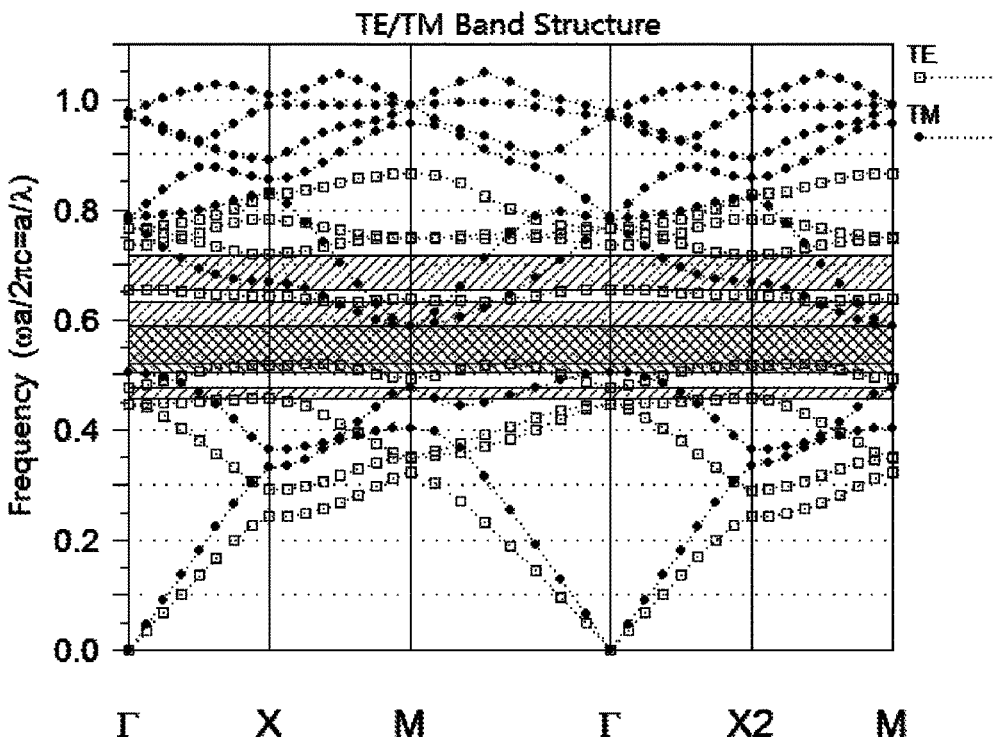
FIG. 6 is a structural diagram of a PBG corresponding to unit cell parameter values adopted in embodiment 4.

The high-refractive-index material is silicon, the low-refractive-index is air, $\alpha=60.04°$, $\beta=27.348°$, b=0.6 a, c=0.45344 a, d=0.0216 a, e=0.0256 a. It can be known from the numerical simulation result of this embodiment in FIG. 6 that the large absolute PBG relative value is 12.4%.

Embodiment 5

Figure 7:
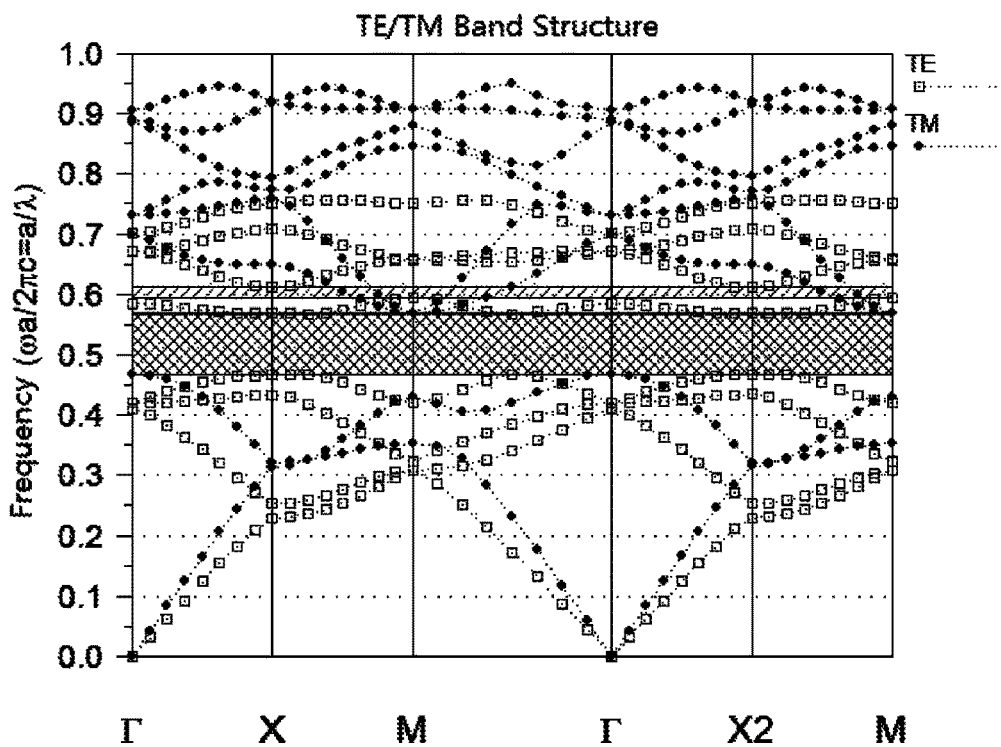
FIG. 7 is a structural diagram of a PBG corresponding to unit cell parameter values adopted in embodiment 5.

The high-refractive-index material is silicon, the low-refractive-index is air, $\alpha=60.04°$, $\beta=27.348°$, b=0.7 a, c=0.45344 a, d=0.0216 a, e=0.0256 a. It can be known from the numerical simulation result of this embodiment in FIG. 7 that the large absolute PBG relative value is 19.21%.

Embodiment 6

Figure 8:
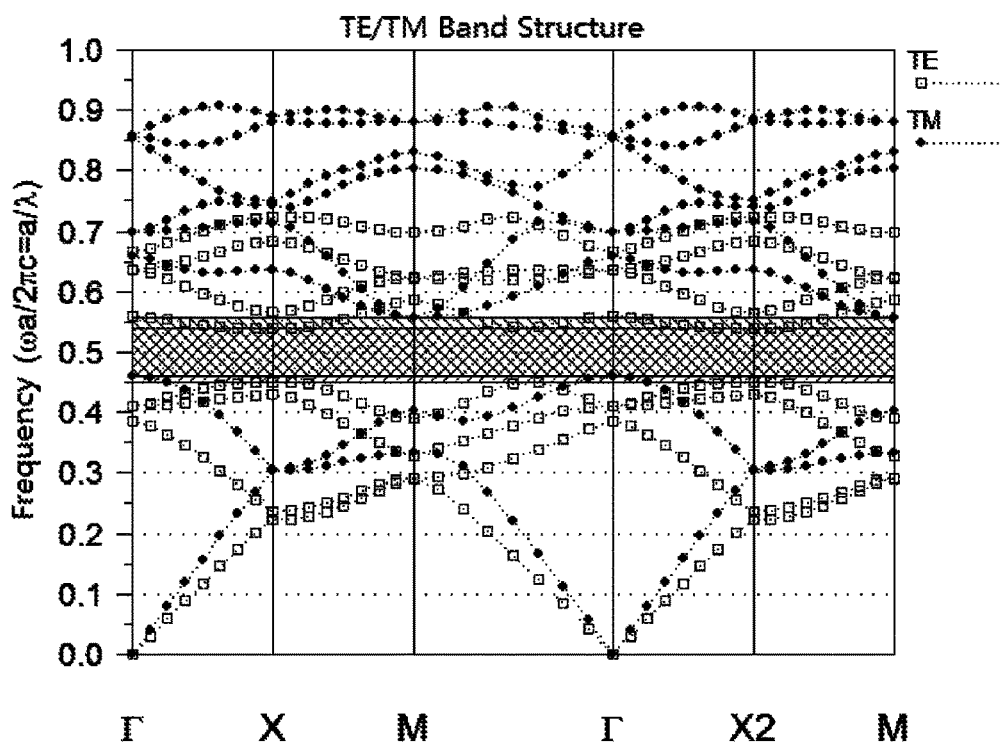
FIG. 8 is a structural diagram of a PBG corresponding to unit cell parameter values adopted in embodiment 6.

The high-refractive-index material is silicon, the low-refractive-index is air, $\alpha=60.04°$, $\beta=27.348°$, b=0.75 a, c=0.45344 a, d=0.0216 a, e=0.0256 a. It can be known from the numerical simulation result of this embodiment in FIG. 8 that the large absolute PBG relative value is 15.75%.

Embodiment 7

Figure 9:
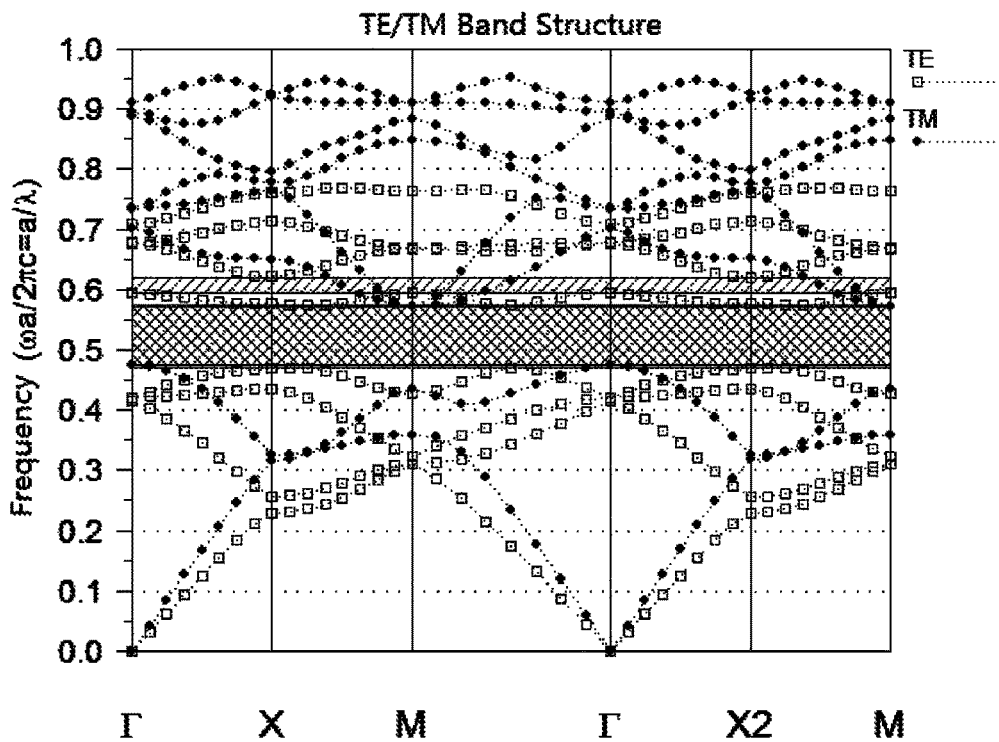
FIG. 9 is a structural diagram of a PBG corresponding to unit cell parameter values adopted in embodiment 7.

The high-refractive-index material is silicon, the low-refractive-index is air, $\alpha=60.04°$, $\beta=25°$, b=0.6927 a, c=0.45344 a, d=0.0216 a, e=0.0256 a. It can be known from the numerical simulation result of this embodiment in FIG. 9 that the large absolute PBG relative value is 18.5%.

Embodiment 8

Figure 10:
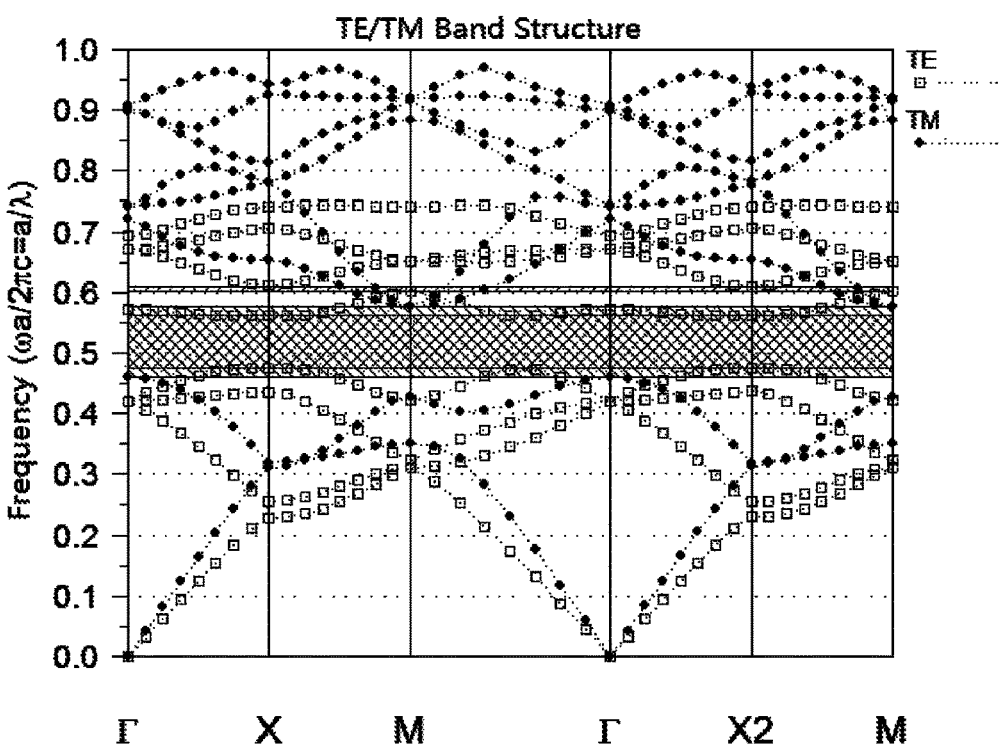
FIG. 10 is a structural diagram of a PBG corresponding to unit cell parameter values adopted in embodiment 8.

The high-refractive-index material is silicon, the low-refractive-index is air, $\alpha=60.04°$, $\beta=37°$, b=0.6927 a, c=0.45344 a, d=0.0216 a, e=0.0256 a. It can be known from the numerical simulation result of this embodiment in FIG. 10 that the large absolute PBG relative value is 16.63%.

Embodiment 9

Figure 11:
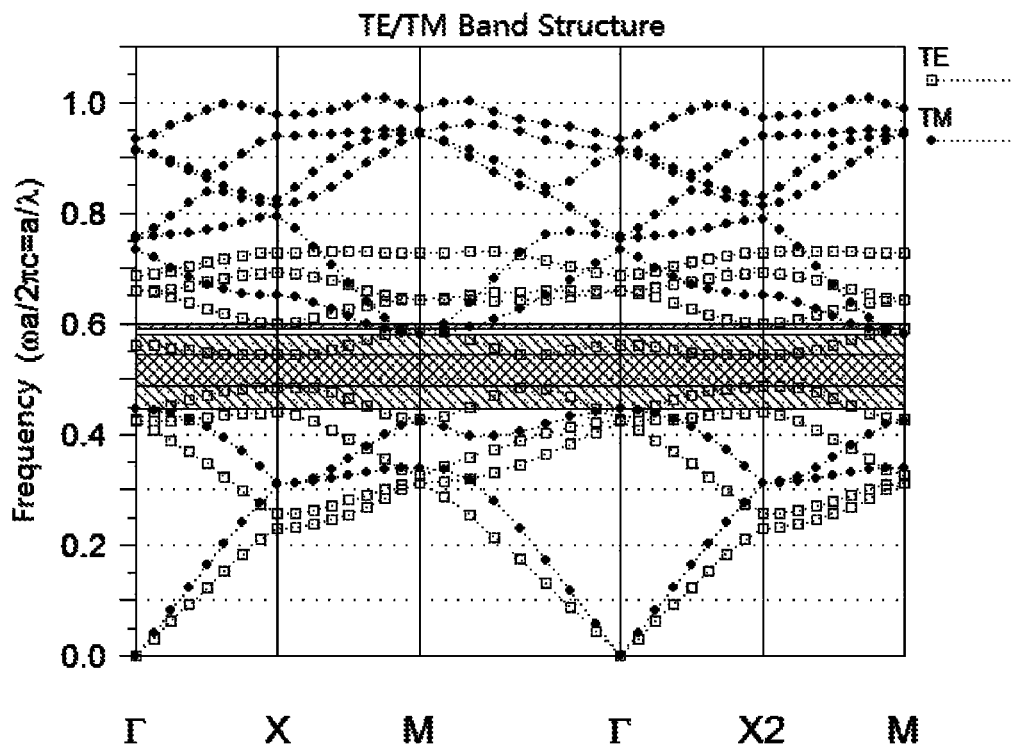
FIG. 11 is a structural diagram of a PBG corresponding to unit cell parameter values adopted in embodiment 9.

The high-refractive-index material is silicon, the low-refractive-index is air, $\alpha=60.04°$, $\beta=50°$, b=0.6927 a, c=0.45344 a, d=0.0216 a, e=0.0256 a. It can be known from the numerical simulation result of this embodiment in FIG. 11 that the large absolute PBG relative value is 11.19%.

Embodiment 10

Figure 12:
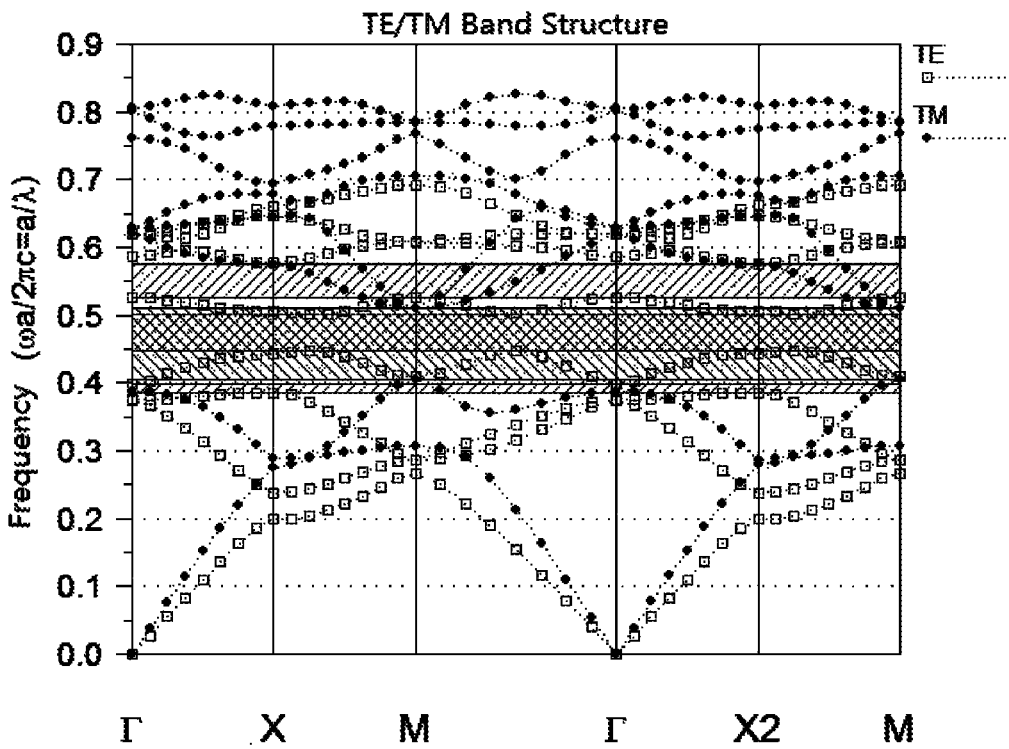
FIG. 12 is a structural diagram of a PBG corresponding to unit cell parameter values adopted in embodiment 10.

The high-refractive-index material is silicon, the low-refractive-index is air, $\alpha=60.04°$, $\beta=27.348°$, b=0.6927 a, c=0.33 a, d=0.0216 a, e=0.0256 a. It can be known from the numerical simulation result of this embodiment in FIG. 12 that the large absolute PBG relative value is 11.64%.

Embodiment 11

Figure 13:
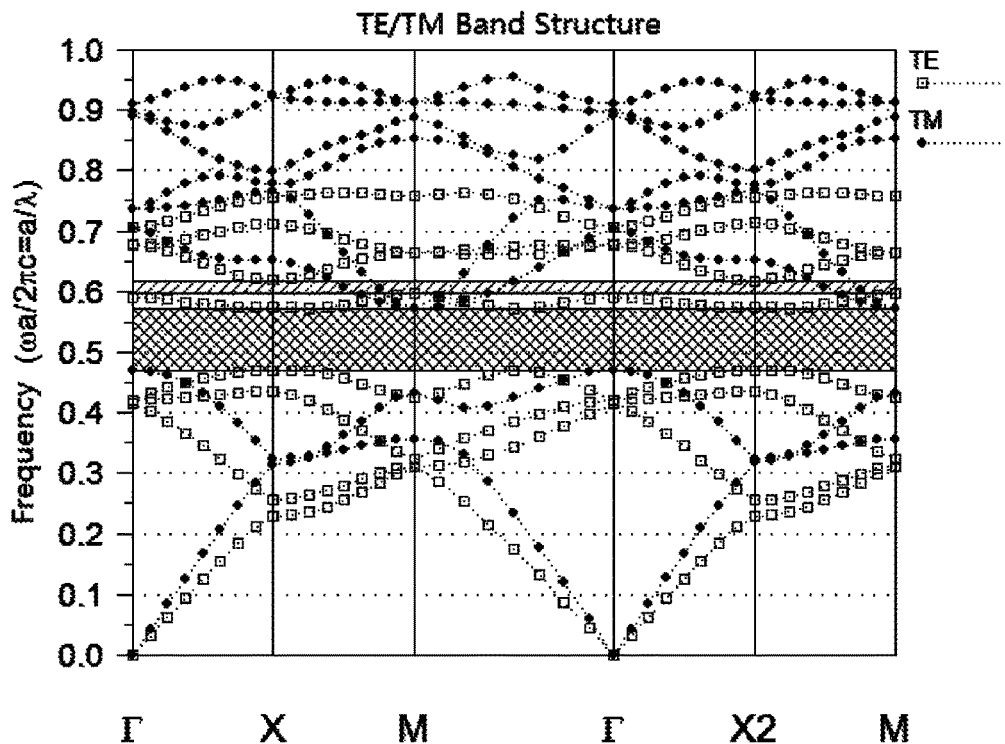
FIG. 13 is a structural diagram of a PBG corresponding to unit cell parameter values adopted in embodiment 11.

The high-refractive-index material is silicon, the low-refractive-index is air, $\alpha=60.04°$, $\beta=27.348°$, b=0.6927 a, c=0.45344 a, d=0.0216 a, e=0.0256 a. It can be known from the numerical simulation result of this embodiment in FIG. 13 that the large absolute PBG relative value is 19.51%.

Embodiment 12

Figure 14:
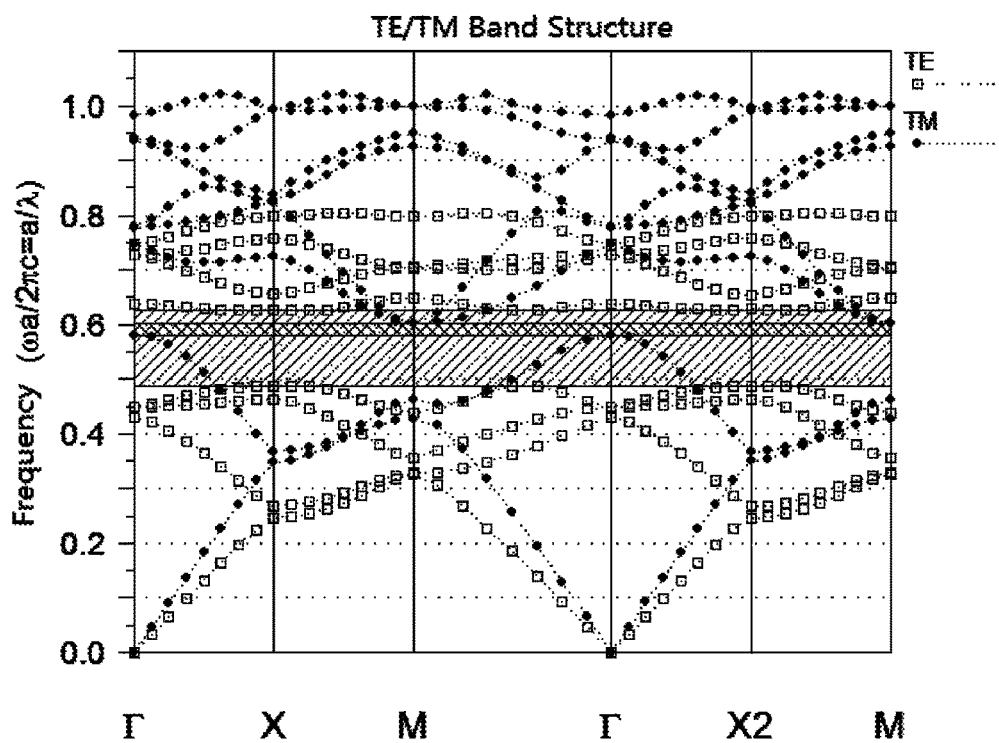
FIG. 14 is a structural diagram of a PBG corresponding to unit cell parameter values adopted in embodiment 12.

The high-refractive-index material is silicon, the low-refractive-index 1 is air, $\alpha=60.04°$, $\beta=27.348°$, b=0.6927 a, c=0.5 a, d=0.0216 a, e=0.0256 a. It can be known from the numerical simulation result of this embodiment in FIG. 14 that the large absolute PBG relative value is 3.3%.

Embodiment 13

Figure 15:
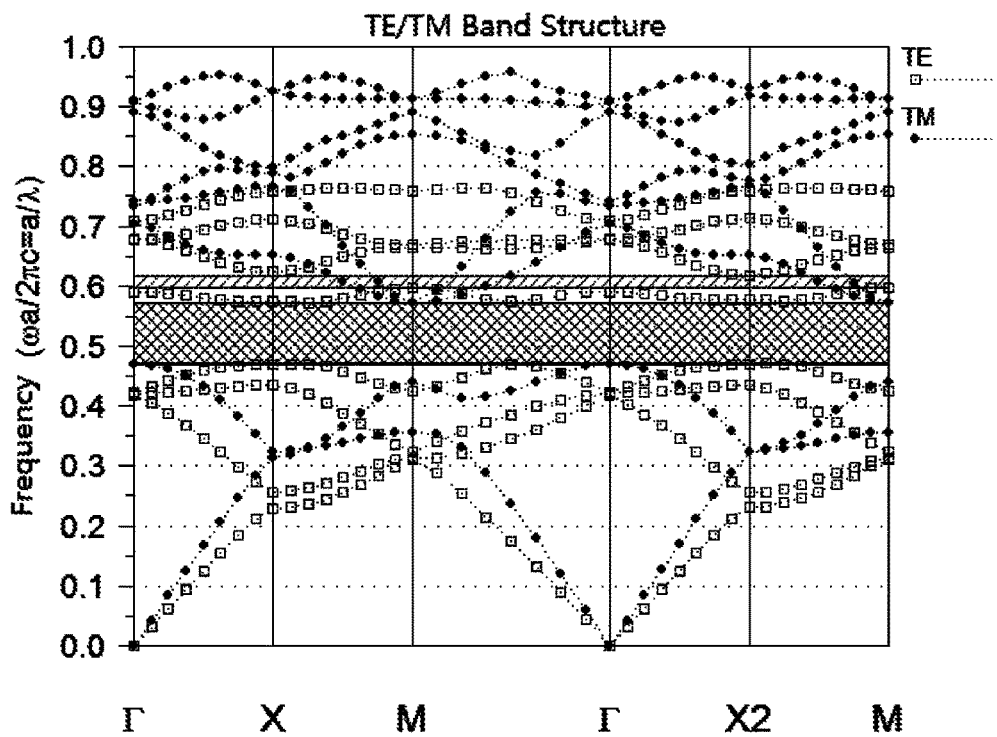
FIG. 15 is a structural diagram of a PBG corresponding to unit cell parameter values adopted in embodiment 13.

The high-refractive-index material is silicon, the low-refractive-index is air, $\alpha=60.04°$, $\beta=27.348°$, b=0.6927 a, c=0.45344 a, d=0.01 a, e=0.0256 a. It can be known from the numerical simulation result of this embodiment in FIG. 15 that the large absolute PBG relative value is 19.3%.

Embodiment 14

Figure 16:
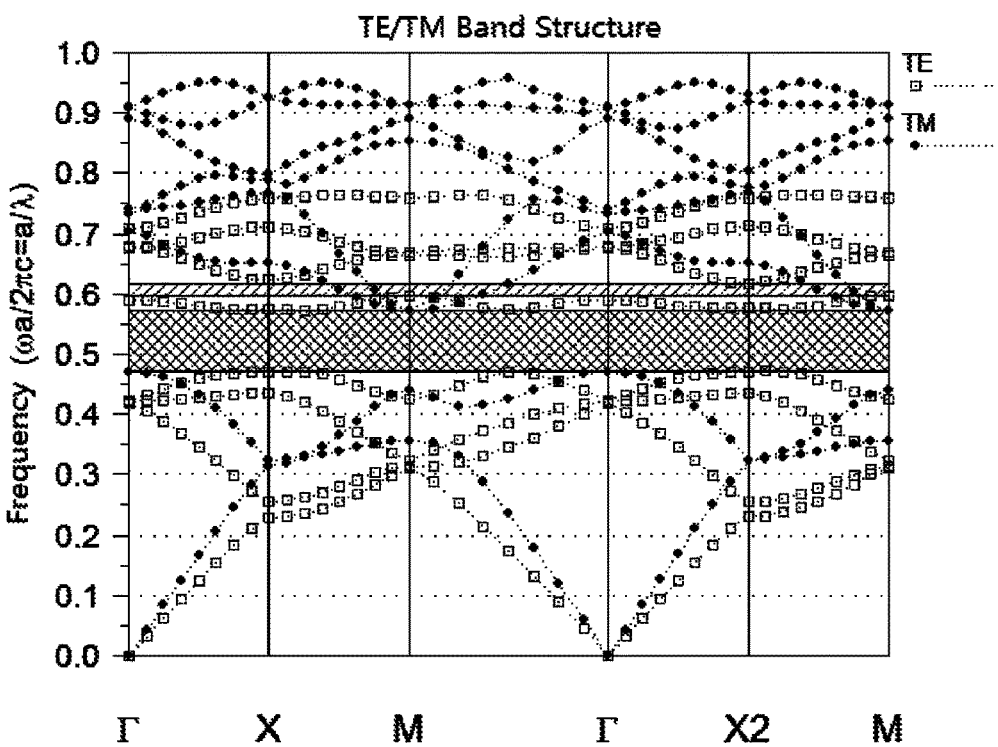
FIG. 16 is a structural diagram of a PBG corresponding to unit cell parameter values adopted in embodiment 14.

The high-refractive-index material is silicon, the low-refractive-index is air, $\alpha=60.04°$, $\beta=27.348°$, b=0.6927 a, c=0.45344 a, d=0.015 a, e=0.0256 a. It can be known from the numerical simulation result of this embodiment in FIG. 16 that the large absolute PBG relative value is 19.31%.

Embodiment 15

Figure 17:
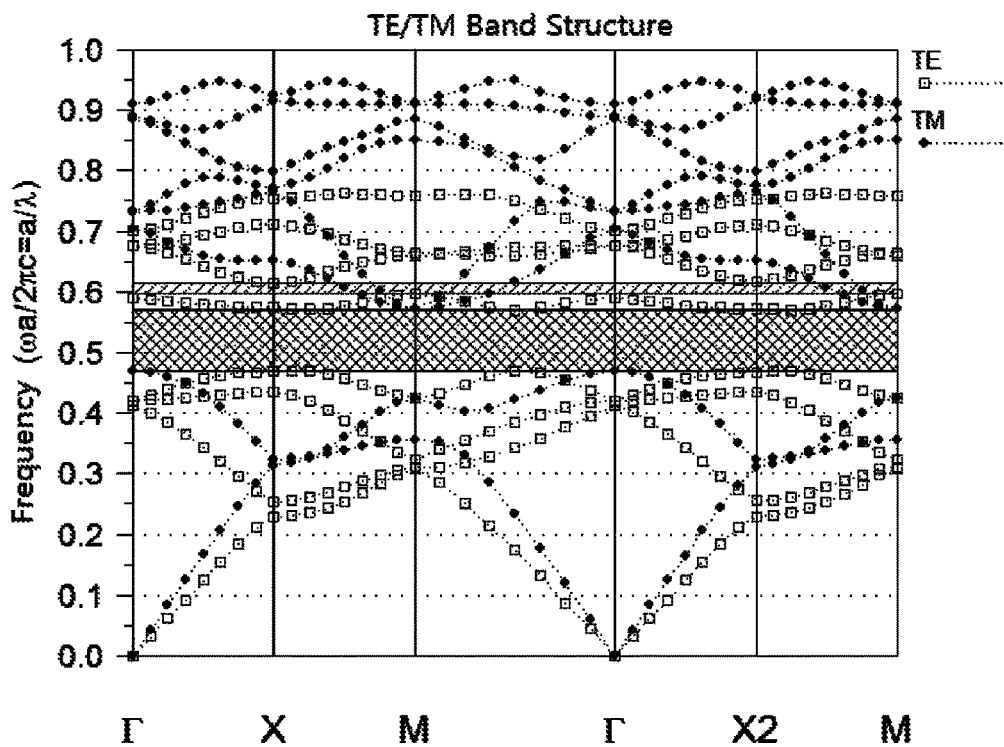
FIG. 17 is a structural diagram of a PBG corresponding to unit cell parameter values adopted in embodiment 15.

The high-refractive-index material is silicon, the low-refractive-index is air, $\alpha=60.04°$, $\beta=27.348°$, b=0.6927 a, c=0.45344 a, d=0.03 a, e=0.0256 a. It can be known from the numerical simulation result of this embodiment in FIG. 17 that the large absolute PBG relative value is 19.25%.

Embodiment 16

Figure 18:
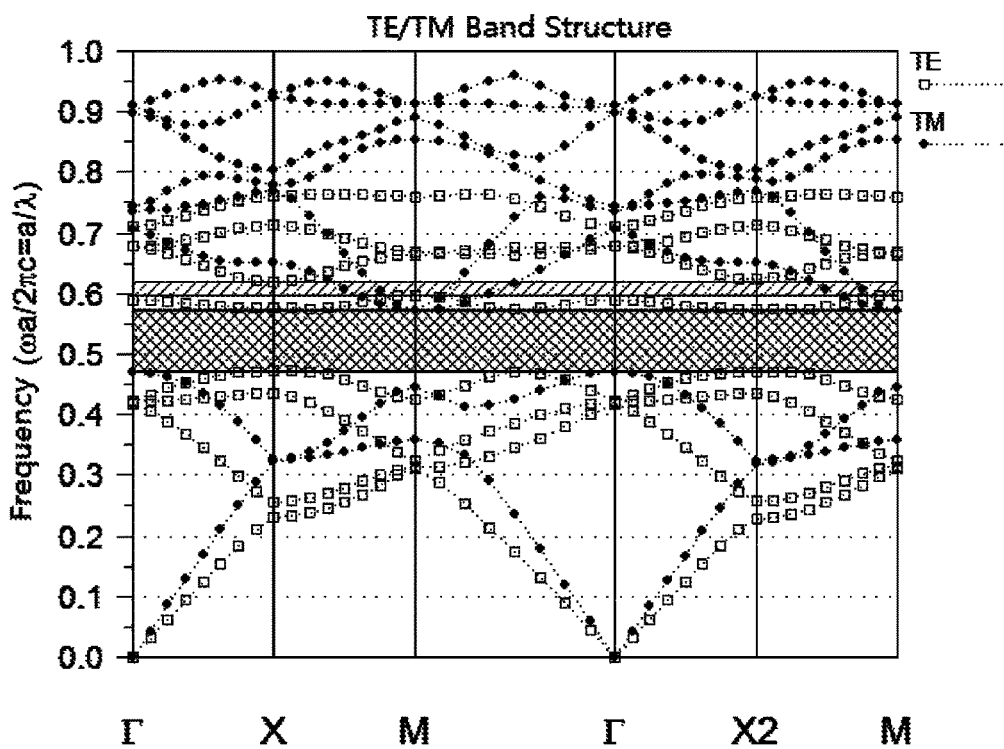
FIG. 18 is a structural diagram of a PBG corresponding to unit cell parameter values adopted in embodiment 16.

The high-refractive-index material is silicon, the low-refractive-index is air, α=60.04°, β=27.348°, b=0.6927 a, c=0.45344 a, d=0.0216 a, e=0.01 a. It can be known from the numerical simulation result of this embodiment in FIG. 18 that the large absolute PBG relative value is 19.24%.

Embodiment 17

Figures 19, 20:
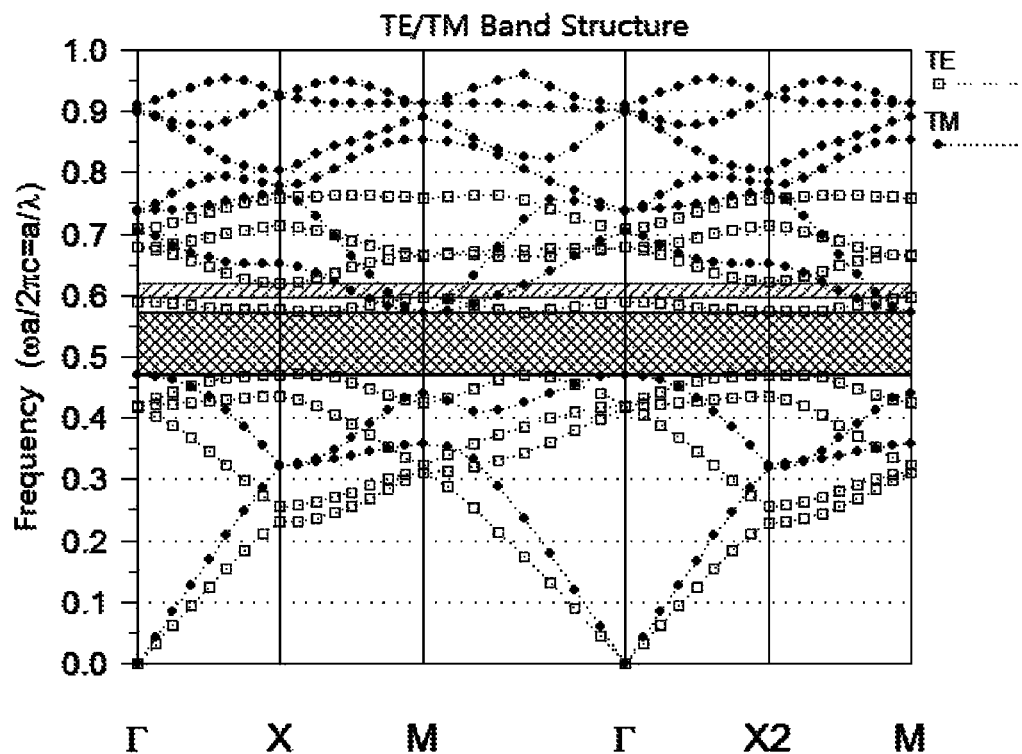
FIG. 19 is a structural diagram of a PBG corresponding to unit cell parameter values adopted in embodiment 17.
FIG. 20 is a structural diagram of a PBG corresponding to unit cell parameter values adopted in embodiment 18.

The high-refractive-index material is silicon, the low-refractive-index is air, α=60.04°, β=27.348°, b=0.6927 a, c=0.45344 a, d=0.0216 a, e=0.015 a. It can be known from the numerical simulation result of this embodiment in FIG. 19 that the large absolute PBG relative value is 19.346%.

Embodiment 18

The high-refractive-index material is silicon, the low-refractive-index is air, α=60.04°, β=27.348°, b=0.6927 a, c=0.45344 a, d=0.0216 a, e=0.03 a. It can be known from the numerical simulation result of this embodiment in FIG. 20 that the large absolute PBG relative value is 19.317%.

While the invention has been described in terms of various specific embodiments, those skilled in the art will recognize that the invention can be practiced with modification within the spirit and scope of the claims.

We claim:

1. A 2D square-lattice PhC based on cross rods and rotated hollow square rods, comprising:
a high-refractive-index dielectric rod, a cross plate dielectric rod and a low-refractive-index background dielectric rod; said PhC structure is formed by unit cells arranged according to square-lattices; the lattice constant of said square-lattice PhC is a; the unit cell of said square-lattice PhC includes a high-refractive-index rotated hollow square rod, a cross plate dielectric rod and a background dielectric; the outer contour of said hollow square rod is a first rotated square rod with the rotated angle α of 45° to 65° and a side length b of 0.6 a to 0.75 a; the cross section of the hollow part of said hollow square rod is a second rotated square rod with the rotated angle β of 25° to 50° and the side length c of 0.33 a to 0.5 a; said first rotated square rod is connected with said cross plate dielectric rod; said cross plate dielectric rod is located in the middle of the square edge of the square-lattice; plate dielectric rods of said cross plate dielectric rod in the horizontal and vertical directions have different widths; the width d of said plate dielectric rod in the horizontal direction is 0.01 a to 0.03 a; and the width e of said plate dielectric rod in the vertical direction is 0.01 a to 0.03 a.

2. The 2D square-lattice PhC based on cross rods and rotated hollow square rods of claim 1, wherein the high-refractive-index dielectric is the one with the refractive index of greater than 2.

3. The 2D square-lattice PhC based on cross rods and rotated hollow square rods of claim 2, wherein the high-refractive-index dielectric is silicon, and the low-refractive-index dielectric is air; the rotated angle α of the first rotated square rod is greater than 45° and less than 65°, and its side length b is greater than 0.6 a and less than 0.75 a; the rotated angle β of the second rotated square rod is greater than 25° and less than 50°, and its side length c is greater than 0.33 a and less than 0.5 a; the width d of the plate dielectric rod in the horizontal direction is greater than 0.01 a and less than 0.03 a; the width e of the plate dielectric rod in the vertical direction is greater than 0.01 a and less than 0.03 a; and the absolute PBG relative value of the PhC structure is greater than 10%.

4. The 2D square-lattice PhC based on cross rods and rotated hollow square rods of claim 2, wherein the high-refractive-index dielectric is silicon, and the low-refractive-index dielectric is air; the rotated angle α of the first rotated square rod is 60.04°, and its side length b is 0.6927 a; the rotated angle β of the second rotated square rod is 27.348°, and its side length c is 0.45344 a; the width d of the plate dielectric rod in the horizontal direction is 0.0216 a; the width e of the plate dielectric rod in the vertical direction is 0.0256 a; and the absolute PBG relative value of the PhC structure is 19.51%.

5. The 2D square-lattice PhC based on cross rods and rotated hollow square rods of claim 1, wherein said high-refractive-index dielectric is silicon, gallium arsenide or titanium dioxide.

6. The 2D square-lattice PhC based on cross rods and rotated hollow square rods of claim 1, wherein the high-refractive-index dielectric is silicon, with the refractive index of 3.4.

7. The 2D square-lattice PhC based on cross rods and rotated hollow square rods of claim 1, wherein said background dielectric is the low-refractive-index dielectric.

8. The 2D square-lattice PhC based on cross rods and rotated hollow square rods of claim 7, wherein the high-refractive-index dielectric is silicon, and the low-refractive-index dielectric is air; the rotated angle α of the first rotated square rod is greater than 45° and less than 65°, and its side length b is greater than 0.6 a and less than 0.75 a; the rotated angle β of the second rotated square rod is greater than 25° and less than 50°, and its side length c is greater than 0.33 a and less than 0.5 a; the width d of the plate dielectric rod in the horizontal direction is greater than 0.01 a and less than 0.03 a; the width e of the plate dielectric rod in the vertical direction is greater than 0.01 a and less than 0.03 a; and the absolute PBG relative value of the PhC structure is greater than 10%.

9. The 2D square-lattice PhC based on cross rods and rotated hollow square rods of claim 7, wherein the low-refractive-index dielectric is air; the rotated angle α of the first rotated square rod is 60.04°, and its side length b is 0.6927 a; the rotated angle β of the second rotated square rod is 27.348°, and its side length c is 0.45344 a; the width d of the plate dielectric rod in the horizontal direction is 0.0216 a; the width e of the plate dielectric rod in the vertical direction is 0.0256 a; and the absolute PBG relative value of the PhC structure is 19.51%.

10. The 2D square-lattice PhC based on cross rods and rotated hollow square rods of claim 1, wherein the low-refractive-index background dielectric is a dielectric with the refractive index of less than 1.6.

11. The 2D square-lattice PhC based on cross rods and rotated hollow square rods of claim 1, wherein said low-refractive-index background dielectric is air, vacuum, magnesium fluoride or silicon dioxide.

12. The 2D square-lattice PhC based on cross rods and rotated hollow square rods of claim 1, wherein said high-refractive-index dielectric is silicon, and said low-refractive-index dielectric is air; the rotated angle α of the first rotated square rod is greater than 45° and less than 65°, and its side length b is greater than 0.6 a and less than 0.75 a; the rotated angle β of the second rotated square rod is greater than 25° and less than 50°, and its side length c is greater than 0.33 a and less than 0.5 a; the width d of the plate dielectric rod in the horizontal direction is greater than 0.01 a and less than 0.03 a; the width e of the plate dielectric rod in the vertical direction is greater than 0.01 a and less than 0.03 a; and the absolute PBG relative value of the PhC structure is greater than 10%.

13. The 2D square-lattice PhC based on cross rods and rotated hollow square rods of claim 1, wherein the high-refractive-index dielectric is silicon, and the low-refractive-index dielectric is air; the rotated angle α of the first rotated square rod is 60.04°, and its side length b is 0.6927 a; the rotated angle β of the second rotated square rod is 27.348°, and its side length c is 0.45344 a; the width d of the plate dielectric rod in the horizontal direction is 0.0216 a; the width e of the plate dielectric rod in the vertical direction is 0.0256 a; and the absolute PBG relative value of the PhC structure is 19.51%.

* * * * *